US 8,024,453 B2

(12) United States Patent
Ahmed et al.

(10) Patent No.: US 8,024,453 B2
(45) Date of Patent: Sep. 20, 2011

(54) MONITORING PERFORMANCE OF DYNAMIC WEB CONTENT APPLICATIONS

(75) Inventors: Mohammad M. Ahmed, Austin, TX (US); Rama S. Vykunta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 11/560,909

(22) Filed: Nov. 17, 2006

(65) Prior Publication Data

US 2008/0120406 A1 May 22, 2008

(51) Int. Cl.
*G06F 15/173* (2006.01)
*G06F 3/00* (2006.01)
*G06F 3/048* (2006.01)

(52) U.S. Cl. ........ 709/224; 709/223; 715/810; 715/843; 715/744

(58) Field of Classification Search .................. 709/227, 709/228, 220, 223, 224, 225; 710/44, 46; 705/4, 7; 700/219; 715/810, 243, 733, 744
See application file for complete search history.

(56) References Cited

U.S. PATENT DOCUMENTS

| | | | | |
|---|---|---|---|---|
| 6,151,643 A * | 11/2000 | Cheng et al. | ..................... | 710/36 |
| 6,263,361 B1 * | 7/2001 | Hoyer et al. | .................. | 709/203 |
| 6,339,750 B1 * | 1/2002 | Hoyer et al. | .................. | 702/182 |
| 6,381,635 B1 * | 4/2002 | Hoyer et al. | .................. | 709/207 |
| 2002/0143932 A1 * | 10/2002 | Quintero et al. | .............. | 709/224 |
| 2002/0143992 A1 * | 10/2002 | McElhaney et al. | .......... | 709/245 |
| 2002/0173997 A1 | 11/2002 | Menard et al. | | |
| 2003/0208297 A1 | 11/2003 | Stawikowski et al. | | |
| 2004/0019662 A1 | 1/2004 | Viswanath et al. | | |
| 2004/0128508 A1 * | 7/2004 | Wheeler et al. | ............... | 713/170 |
| 2004/0177147 A1 | 9/2004 | Joshi et al. | | |
| 2004/0210648 A1 * | 10/2004 | Woodruff | ...................... | 709/221 |
| 2004/0243555 A1 | 12/2004 | Bolsius et al. | | |
| 2005/0177401 A1 | 8/2005 | Koeppel et al. | | |
| 2006/0085734 A1 * | 4/2006 | Balnaves | ....................... | 715/512 |
| 2006/0184627 A1 * | 8/2006 | Howell et al. | ................ | 709/205 |
| 2007/0061785 A1 * | 3/2007 | Prakash | ........................ | 717/127 |
| 2007/0112919 A1 * | 5/2007 | Lyle et al. | ..................... | 709/206 |
| 2008/0059601 A1 * | 3/2008 | Yoshikawa | .................... | 709/212 |
| 2009/0006108 A1 * | 1/2009 | Bodin et al. | ....................... | 705/1 |
| 2009/0006983 A1 * | 1/2009 | Bodin et al. | .................. | 715/754 |

\* cited by examiner

*Primary Examiner* — Joseph Avellino
*Assistant Examiner* — Aftab Nasir Khan
(74) *Attorney, Agent, or Firm* — Francis Lammes; Stephen J. Walder, Jr.; Jeffrey S. LaBaw

(57) ABSTRACT

Monitoring performance of dynamic web content applications, including receiving, at run time, by a monitor agent, data corresponding to each one of a previous verification point and a current verification point; determining, by the monitor agent, whether decision criteria are satisfied, wherein the determining includes comparing the data corresponding to the previous verification point and the data corresponding to the current verification point; and if the decision criteria are satisfied replacing, by the monitor agent, the data corresponding to the previous verification point with the data corresponding to the current verification point.

17 Claims, 6 Drawing Sheets

MONITORING PERFORMANCE OF DYNAMIC WEB CONTENT APPLICATIONS

BACKGROUND OF THE INVENTION

1. Field of the Invention

The field of the invention is data processing, or, more specifically, methods, systems, and products for monitoring performance of dynamic web content applications.

2. Description of Related Art

Information technology ('IT') administrators are increasingly using various web site monitoring, recording, and analysis tools to improve end user experience, deliver desired quality of service ('QoS'), or ensure compliance with a service level agreement ('SLA') for their on-line customers. However, many of these tools are developed for monitoring web sites that have static processes, static web content, or both. Often, these tools fail to recognize the dynamically changing content of the web site. As a result, original scripts developed or recorded for monitoring web site performance have to be repeatedly re-recorded to reflect the dynamic changes to the web site content. Therefore, there is a need for improvement in the monitoring, recording, and analysis tools that provide performance monitoring of dynamic web content applications without having to repeatedly re-record end user transactions.

SUMMARY OF THE INVENTION

Methods, systems, and computer program products are provided for monitoring performance of dynamic web content applications that include receiving, at run time, by a monitor agent, data corresponding to each one of a previous verification point and a current verification point; determining, by the monitor agent, whether decision criteria are satisfied, wherein the determining includes comparing the data corresponding to the previous verification point and the data corresponding to the current verification point; and if the decision criteria are satisfied replacing, by the monitor agent, the data corresponding to the previous verification point with the data corresponding to the current verification point.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
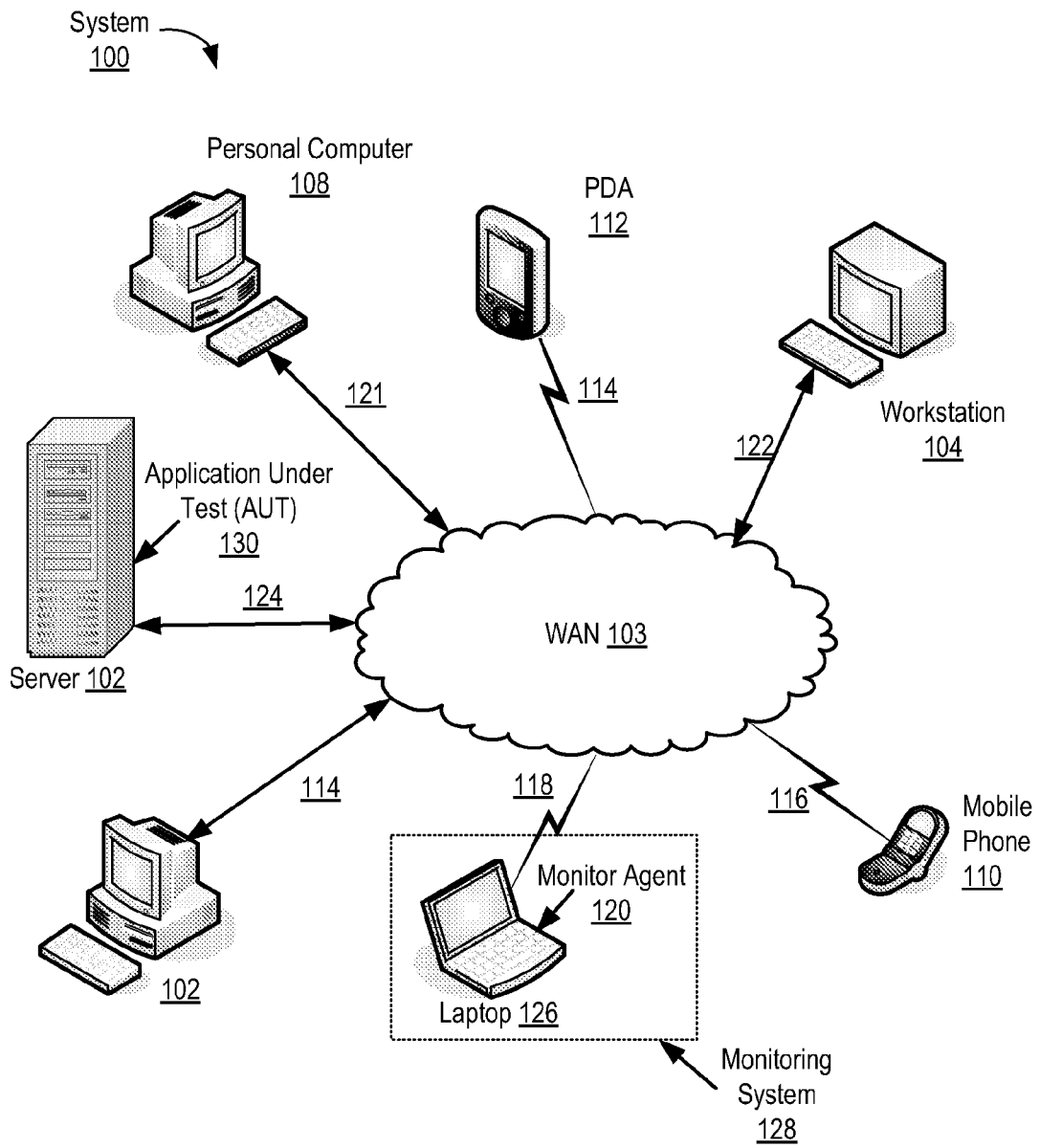
FIG. 1 sets forth a network diagram of a system for monitoring performance of dynamic web content applications according to embodiments of the present invention.

Exemplary methods, systems, and products for monitoring performance of dynamic web content applications in accordance with the present invention are described with reference to the accompanying drawings, beginning with FIG. 1. FIG. 1 sets forth a network diagram of a system (100) for monitoring performance of dynamic web content applications, according to embodiments of the present invention. Several exemplary hosts are connected to a WAN (103) including a PDA (112), a computer workstation (104), a mobile phone (110), server (102), a personal computer (102), and a laptop computer (126). The network-enabled mobile phone (110) connects to the WAN (103) through a wireless link (116), the PDA (112) connects to the WAN (103) through a wireless link (114), and the laptop (126) connects to the WAN (103) through a wireless link (118). In the example of FIG. 1, the personal computer (108) connects to the WAN (103) through a wired connection (121), the workstation (104) connects to the WAN (103) through a wired connection (122), and the server (102) also connects to the WAN (103) through a wired connection (124). The network connection aspect of the architecture of FIG. 1 is only for explanation, not for limitation. In fact, systems for monitoring performance of dynamic web content applications according to embodiments of the present invention may be connected as LANs, WANs, intranets, the Internet, webs, the World Wide Web itself, or other connections as will occur to those of skill in the art. Such networks are media that may be used to provide data communications connections between various devices and computers connected together within an overall data processing system.

The exemplary system (100) of FIG. 1 is capable of monitoring and testing software applications having dynamic web content such as e-commerce, airline reservations, insurance management, and similar others. These exemplary applications typically support a web based graphical user interface ('GUI') to interact with end users, thereby enabling them to conduct transactions via the web. The web sites have dynamic web content as the information provided by the web site is often changing in real-time. Typical examples of web site transactions having dynamic GUI content include shopping for an automobile, checking a bank balance, buying an airline ticket, or enrolling in a healthcare plan online. If a web transaction is slow or non-responsive, an IT provider of a company that owns the web site is viewed as not delivering the desired QoS or complying with the SLA. Without replicating an end user transaction, an IT organization is unable to accurately assess the true end-user experience.

The exemplary system of FIG. 1 includes a number of computers (e.g., 108, 112, 104, 126, 102, and 110) connected for data communications by the WAN (103). The server (102) is configured as a web server to host an application under test ('AUT') (130) such as a dynamic web content application being monitored, and a monitoring system (128). The monitoring system (128) includes the laptop (126) shown to have installed upon it a monitor agent (120) for performing the monitoring function. This designation is for clarity of explanation of installation of the monitor agent (120) only and not for limitations. As discussed above each of the hosts (108, 112, 104, 126, 102, and 110) of FIG. 1 are equally capable of hosting the AUT (130), or capable of hosting the monitor agent (120), or both. A monitor agent is software running on a computer host that is capable of configuring and installing the software on the computer host. The monitor agent is capable of gathering and maintaining performance information describing the performance of the monitored dynamic web content application.

In the exemplary system (100) of FIG. 1 the monitor agent (120) is capable of replicating an end-user experience. The content of a GUI display, e.g., a web page, that is accessible by the end user may be detected, monitored, and tested for certain conditions such as existence of a desired content on the web page, e.g., a drop down menu having a particular keyword(s), HyperText Transport Protocol ('HTTP') response status codes, and similar others. Monitoring performance of web sites by an end user involves executing a web based transaction from an end user perspective, and recording a script to capture the steps or the sequence of the end user transaction. The recorded script emulates user actions interacting with the GUI (e.g., web browser display) of the AUT (130). The recorded script is then played back on a scheduled or on-demand basis to monitor performance of the web site. The functionality of the recorded script is enhanced by executing a monitoring policy included in the monitor agent (120), according to embodiments of the present invention.

The exemplary system of FIG. 1 includes the monitor agent (120) that is also capable of performing additional functions such as configuring and administering the monitoring policy, analyzing data, and event notification in addition to recording a script, and playing back the recorded script. The monitor agent (120) allows IT administrators to formulate decision criteria or define thresholds, which are configured to evaluate and automatically update the frequent changes in data of selectable contents of the GUI without having to re-record the script. The selectable contents of the GUI display typically include drop down menu lists, images, selection buttons, applets, forms, controls, scripts, and similar others. As an example, a threshold is created by selecting one of the drop down menus on the web display as an initial verification point, and storing initial data corresponding to the initial verification point for evaluating the threshold. Data as described herein refers to any one of a property, a value, and content corresponding to a verification point. As an example, a particular drop down menu on the web display may list 5 content keywords, as choices for possible user selection. Due to dynamic changes in the web site, e.g., as a result of an increase in product inventory, the particular drop down menu list may be dynamically updated to include 7 content keywords as choices for possible user selection. The automatic updating of the data of the selectable contents, e.g., from 5 content keywords (previous data) to 7 content keywords (current data), advantageously accommodates changes in dynamic web content applications, and avoids the need to re-record the scripts in view of these changes. The system (100) is thus capable of delivering desired QoS by replicating the end user experience, without incurring the extra cost and loss of efficiency in having to re-record the script each time the web content changes.

In the exemplary system (100) of FIG. 1 the monitor agent (120) is capable of receiving, at run time, by a monitor agent, data corresponding to each one of a previous verification point and a current verification point; determining, by the monitor agent, whether decision criteria are satisfied, wherein the determining includes comparing the data corresponding to the previous verification point and the data corresponding to the current verification point; and if the decision criteria are satisfied replacing, by the monitor agent, the data corresponding to the previous verification point with the data corresponding to the current verification point.

The exemplary monitor agent functions are presented for explanation and not for limitation. In fact, new rules and decision making logic that define the monitoring policy may be added to the monitor agent in many ways and therefore, monitor agent functions according to the present invention include many different functions as will occur to those of skill in the art.

The arrangement of devices making up the exemplary system (100) illustrated in FIG. 1 is for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), Bluetooth, proprietary protocols, and others as will occur to those of skill in the art. Various embodiments of the present invention may be implemented on a variety of hardware platforms in addition to those illustrated in FIG. 1.

Monitoring performance of dynamic web content applications in accordance with the present invention is generally implemented with computers, that is, with automated computing machinery. In the system (100) of FIG. 1, for example, all the nodes, servers, and communications devices are implemented to some extent at least as computers. For further explanation, therefore, FIG. 2 sets forth a block diagram of automated computing machinery comprising an exemplary monitoring system (128) useful in monitoring performance of dynamic web content applications according to embodiments of the present invention. The monitoring system (128) of FIG. 2 includes at least one computer processor (256) or 'CPU' as well as random access memory (268) ('RAM') which is connected through a system bus (260) to processor (256) and to other components of the library management system.

Stored in RAM (268) is the monitor agent (120) for monitoring performance of dynamic web content applications according to the present invention including computer program instructions receiving, at run time, by a monitor agent, data corresponding to each one of a previous verification point and a current verification point; determining, by the monitor agent, whether decision criteria are satisfied, wherein the determining includes comparing the data corresponding to the previous verification point and the data corresponding to the current verification point; and if the decision criteria are satisfied replacing, by the monitor agent, the data corresponding to the previous verification point with the data corresponding to the current verification point. Embodiments also typically include retaining, by the monitor agent, the data corresponding to the previous verification point if the decision criteria are not satisfied. Embodiments also typically include sending a notification such as an e-mail to advise a change from the data corresponding to the previous verification point to the data corresponding to the current verification point.

Figure 2:
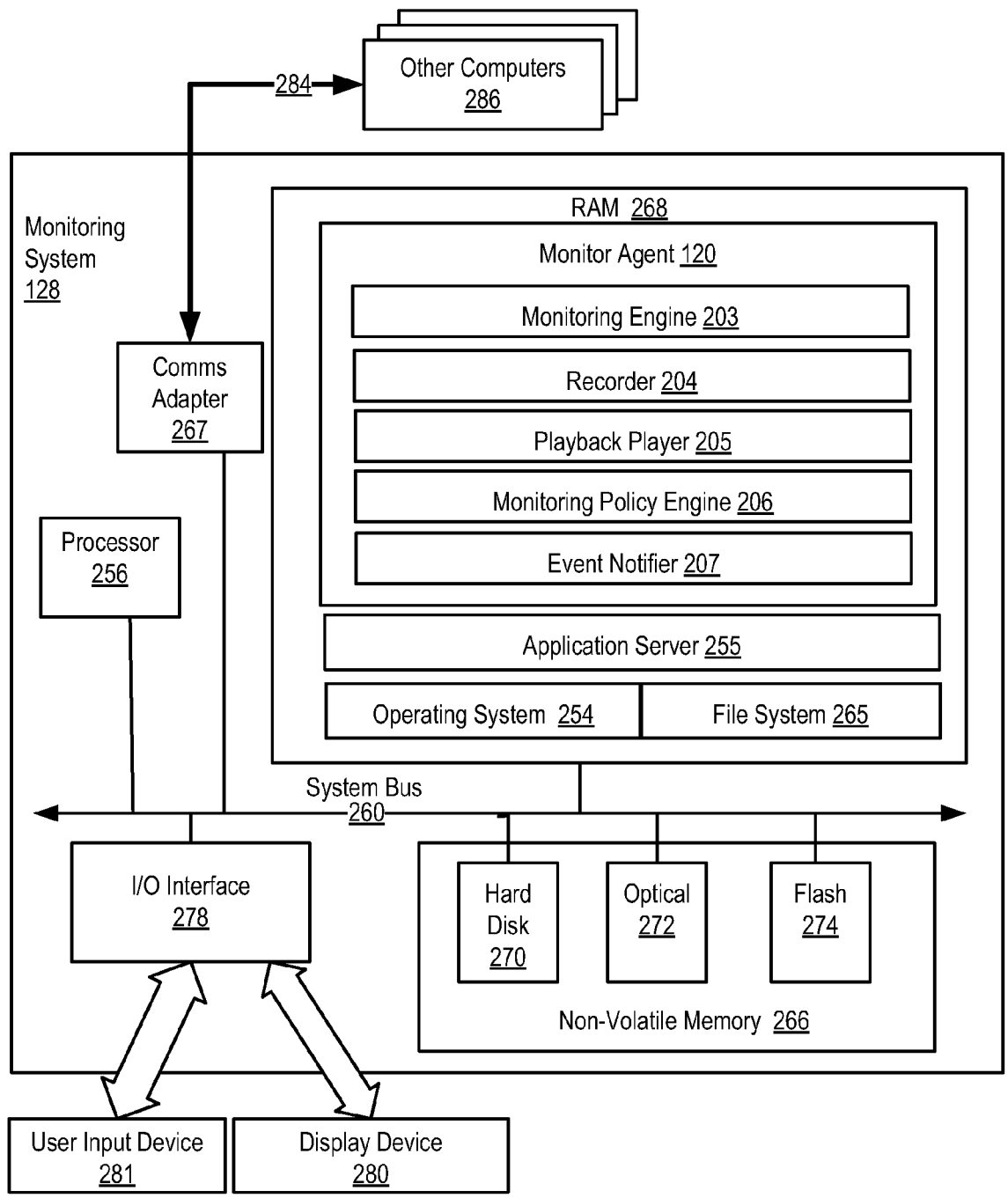
FIG. 2 sets forth a block diagram of automated computing machinery comprising an exemplary library management system useful in monitoring performance of dynamic web content applications according to embodiments of the present invention.

The monitor agent (120) of FIG. 2 includes a monitoring engine (203) that contains computer program instructions for requesting, receiving and storing data from the AUT (130) running on a web site being monitored, a recorder (204) that contains computer program instructions for generating a script of an end user transaction at the web site, a playback player (205) that contains computer program instructions for executing the script recorded by the recorder (204), a monitoring policy engine (206) that contains computer program instructions for defining decision criteria and logic to automatically select one or more outputs in response to receiving one or more inputs, an event notifier (207) that contains computer program instructions for notifying an occurrence of an event such as a change in a keyword.

Also stored in RAM (268) is an application server (255), a software platform that provides services and infrastructure required to develop and deploy business logic necessary to provide web clients with access to enterprise information systems. Also stored in RAM (268) is a file system (265), a software system that provides data filing services and infrastructure required to develop and deploy logic necessary to read, write, and store data, e.g., data received from web sites. The data may be stored locally in RAM (268), on computers connected to the WAN 103, in an enterprise wide repository, or in cyberspace that may be located with a universal resource locator ("URL"). Also stored in RAM (268) is an operating system (254). Operating systems useful in computers according to embodiments of the present invention include UNIX™, Linux™, Microsoft XP™, AIX™, IBM's i5/OS™, and others as will occur to those of skill in the art. Operating system (254), application server (255), file system (265), and monitor agent (120) in the example of FIG. 2 are shown in RAM (168), but many components of such software typically are stored in non-volatile memory (166) also.

Monitoring system (128) of FIG. 2 includes non-volatile computer memory (266) coupled through a system bus (260) to processor (256) and to other components of the monitoring system (128). Non-volatile computer memory (266) may be implemented as a hard disk drive (270), optical disk drive (272), electrically erasable programmable read-only memory space (so-called 'EEPROM' or 'Flash' memory) (274), RAM drives (not shown), or as any other kind of computer memory as will occur to those of skill in the art.

The exemplary monitoring system (128) of FIG. 2 includes one or more input/output interface adapters (278). Input/output interface adapters implement user-oriented input/output through, for example, software drivers and computer hardware for controlling output to display devices (280) such as computer display screens, as well as user input from user input devices (281) such as keyboards and mice.

The exemplary monitoring system (128) of FIG. 2 includes a communications adapter (267) for implementing data communications (284) with other computers (286). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for monitoring performance of dynamic web content applications according to embodiments of the present invention include modems for wired dial-up communications, Ethernet (IEEE 802.3) adapters for wired network communications, and IEEE 802.11a/b/g adapters for wireless network communications.

Figure 3:
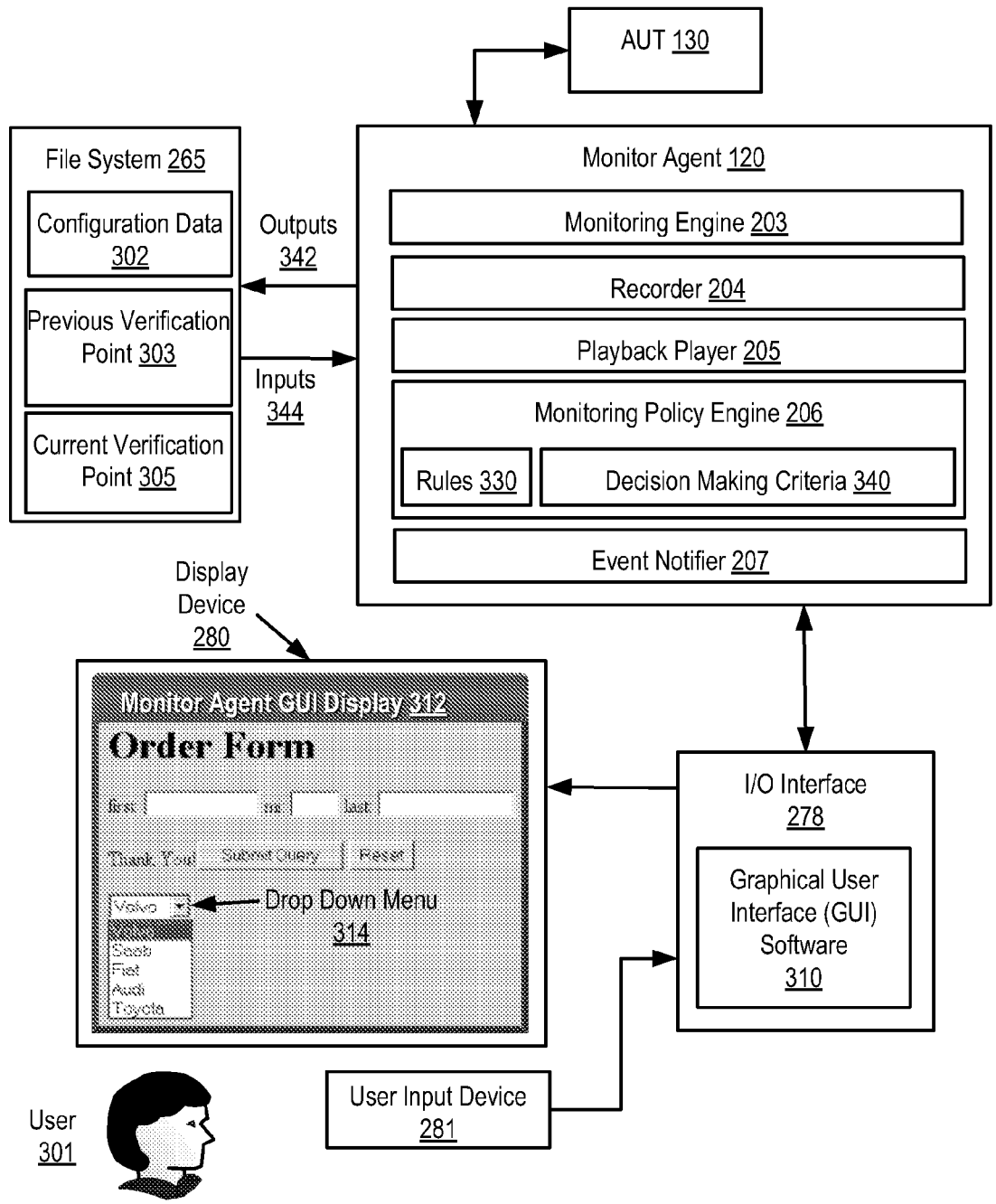
FIG. 3 sets forth an end-to-end block diagram illustrating an exemplary monitoring system for monitoring performance of dynamic web content applications according to embodiments of the present invention.

For further explanation, FIG. 3 sets forth an end-to-end block diagram illustrating an exemplary monitoring system for monitoring performance of dynamic web content applications according to embodiments of the present invention. The exemplary monitoring system (128) includes the monitor agent (120) that is operable to communicate with web sites hosting applications with dynamic web content such as the AUT (130), send and receive requests for data to and from the file system (265), and is able to interact with a user (301) using the I/O interface (278) with GUI software (310), the display device (280), and the user input device (281). The monitor agent (120) or a portion thereof such as the recorder (204), the playback player (205), and others, is capable of being placed in several operating modes such as run time or execution mode, configuration mode, test mode, and maintenance or debug mode. Some operating modes may co-exist. For example, configuration changes may be performed on-line while the monitor agent (120) is being executed. In the configuration mode, the monitor agent (120) is configured to define initial or default values, which are stored as configuration data (302) in the file system (265).

In the exemplary monitoring system (128) of FIG. 3, user (301) using GUI software (310) starts the recorder (204) and opens a GUI display (312), e.g., a web browser, to access a web site being monitored. The user interacts with the AUT (130) running on the web site to conduct a desired transaction. The recorder (204) records the steps to conduct the transaction. The recorder (204) is stopped upon completion of the transaction. The recorded script as well as the web application contents, along with the selectable contents of the GUI display (312) including a drop down menu list (314), other drop down menu lists, images, selection buttons, applets, forms, controls, scripts, and similar others, are recorded based on the user's interaction with the AUT (130). Any one of the selectable contents of the GUI display (312) that is of interest to the user (301) is available as a verification point. The verification point advantageously provides a base reference to compare changes within the GUI display (312). The verification point may include data, properties, content, property values, alphanumeric text, numbers, and similar other, all of which may be generally referred to as data. As an example, the drop down menu (314) located at (x, y) pixels relative to a reference includes 5 content keywords having values 'Volvo', 'Saab', 'Fiat', 'Audi', and 'Toyota' is selectable as a verification point. The captured web contents including the data are saved by the file system (265) for later use.

In the exemplary monitoring system (128) of FIG. 3, the user (301) configures decision criteria (340) or thresholds or conditions by using one of the available verification points for the drop down menu list, e.g., by using the drop down menu (314) with the 5 content keywords having values 'Volvo', 'Saab', 'Fiat', 'Audi', and 'Toyota'. The decision criteria (340) are configured to determine a change in any one of these 5 content keywords and take an action in response to the change. For example, changes in the number of content keyword items, e.g., from 5 content keywords to 7 content keywords, actual value of the content keyword, e.g., new content keyword 'Mercedes', or changes in the location of the keyword contents from (x, y) co-ordinates to (x1, y1) co-ordinates are detected and used in the decision making. During the configuration of the monitoring policy engine (206) using the recorded script, a flag or marker (not shown) is set as a trigger to automatically execute the monitoring policy engine (206). The monitoring policy engine (206) is also capable of being executed at run time on a scheduled basis, or on demand, or automatically upon completion of the playback script.

In the exemplary monitoring system (128) of FIG. 3, the monitoring policy engine (206) is configured by defining a set of rules (330). The set of rules (330) include instructions or commands that are executable at run time to evaluate decision criteria (340) or thresholds and automatically select one or more actions, e.g., providing one or more outputs (342) in response to receiving one or more inputs (344). The set of rules (330) include instructions such as IF ... THEN ... ELSE for performing decision making functions such as comparing, reading, writing, starting, stopping, computing, selecting, and similar others to evaluate the decision criteria (340).

An exemplary set of rules (330) that formulate the decision criteria (340) to arrive at a decision for a particular monitoring application are shown below in the form of C-like pseudo code:

```
StartPlayback( );
capturedData = CapturePlaybackData( );
boolean captureNewBaseLine = false;
if (baseline != capturedData) {
    if (optionASelected) {
        if (withinTimeRange) captureNewBaseLine = true;
    }
    }
    else if (optionBSelected) captureNewBaseLine = true;
    else if (optionCSelected) captureNewBaseLine = true;
    else if (optionDSelected) captureNewBaseLine = true;
    if (captureNewBaseLine)
        newBaseLineData=CaptureNewBaseLineData( );
    if (optionASelected || optionBSelected) {
        UploadNewBaseLineToRepository( );
        SendEmailToITAdmin( );
    }
    if (optionCSelected)
        SendEmailToITAdminWithNewAndOldBaseLineData( );
    if (optionDSelected) {
        SendEmailToITAdminWithNewAndOldBaseLineData( );
        if (AskAdminIfHeAcceptsChange( ))
            UploadNewBaseLineToRepository( );
    }
    FailMonitoringPolicy( );
    IssueAlertToMonitoringSystem( );
    MonitoringFailed( );
}
else MonitoringSuccessful( );
```

The exemplary set of rules (330) provide 4 different options A, B, C and D to take 4 separate actions. In fact, the number of options provided may be different for each monitoring application as will occur to those of skill in the art. Monitoring is successful if data matching occurs between previous and current values of a verification point and is unsuccessful if the data matching does not occur. The inputs (344) to the set of rules (330) include values of data stored in the file system (265), timer inputs, user selection inputs, HTTP return codes, and similar others. The outputs (342) that are generated by the monitoring policy engine (206) in response to the inputs, include writing values to update data stored in the file system (265), sending an e-mail notification, performing no action, e.g., to retain existing values of the data stored in the file system (265), or similar other.

In the exemplary monitoring system (128) of FIG. 3, the monitoring policy engine (206) is configured by defining the decision criteria (340). The decision criteria (340) or thresholds or conditions, as defined by the rules (330), may be as simple as making a comparison between two data values to determine a match, or they may include executing a complex algorithm to evaluate several inputs. One of the decision making rules may include a user providing an input to arrive at a decision. For example, the rule may request a user (301) such as the IT administrator to provide an input to make a decision based on data corresponding to the previous verification point (303) and data corresponding to the current verification point (305). A user (301) initially defines or selects an initial verification point by selecting one or more keywords, or one or more images, or additional desired GUI content from the web site for monitoring. As described earlier, the web page being monitored may also include additional selectable GUI display (312) content such as applets, forms, controls, scripts, and similar others. Additional decision criteria such as time period may be added. The initially captured data for the keywords, or images are stored in the file system (265) as a previous verification point (303).

In the exemplary monitoring system (128) of FIG. 3, when the recorded script is played back, dynamic data including current data for the keywords, or images is captured from the web site being monitored, is received by the monitor agent (120) and stored by the file system (265). Current data for the keywords, or images are stored as a current verification point (305), which may be the same as or may be different than the initially captured data for the keywords, or images stored in the file system (265) as the previous verification point (303).

Figure 4:
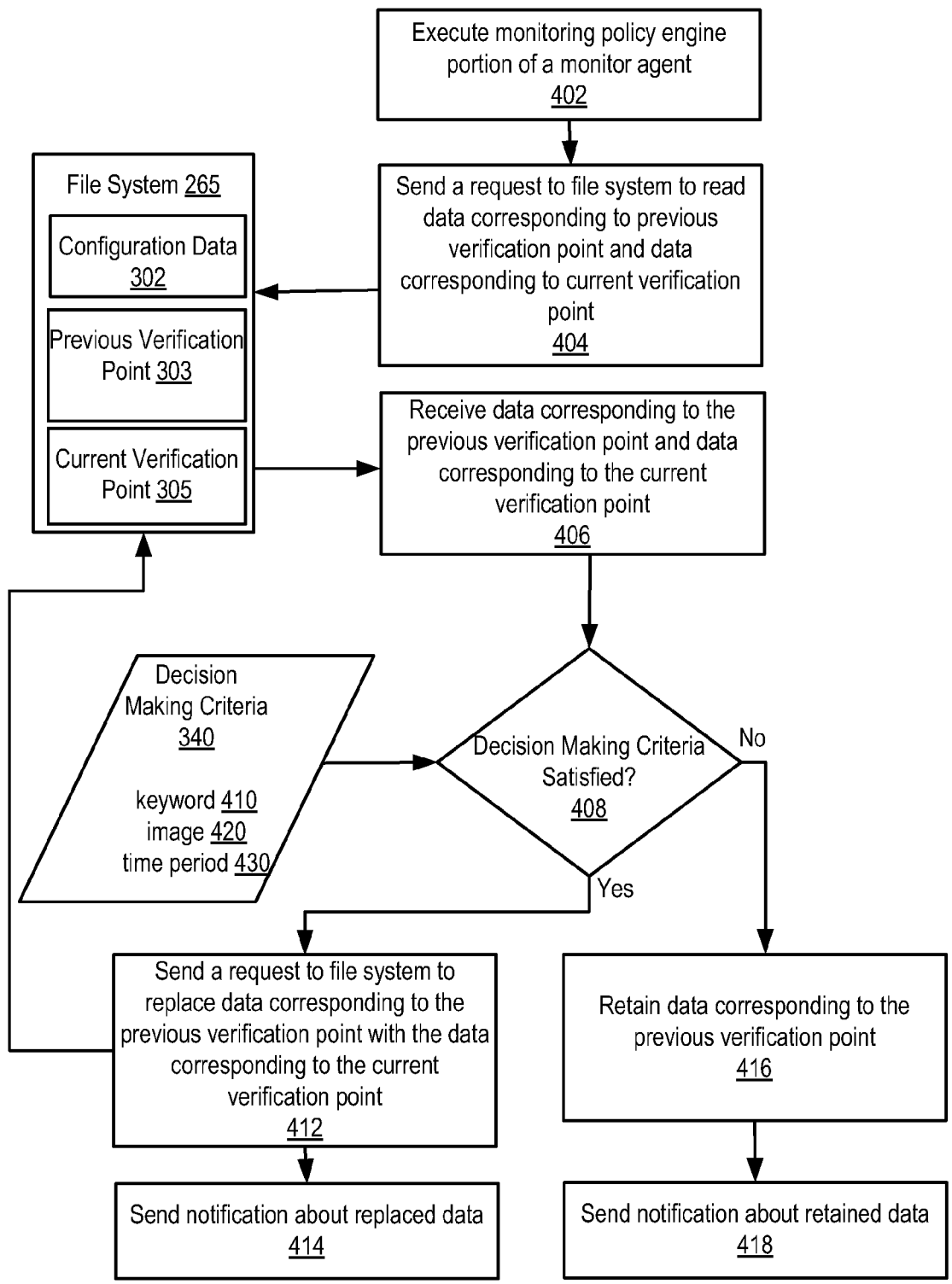
FIG. 4 sets forth a flow chart illustrating an exemplary method for monitoring performance of dynamic web content applications according to embodiments of the present invention.

As discussed above, the monitoring system according to the present invention automatically updates data corresponding to the previous verification point (303) and data corresponding to the current verification point (305) based on the rules (330). For further explanation, therefore, FIG. 4 sets forth a flow chart illustrating an exemplary method for monitoring performance of dynamic web content applications according to embodiments of the present invention. The method of FIG. 4 includes executing (402) the monitoring policy engine (206) portion of the monitor agent (120). As described earlier, the monitoring policy engine (206) is executed at run time on a scheduled basis, or on demand, or automatically upon completion of the playback script. The method of FIG. 4 includes sending (404) a request to the file system (265) to read data corresponding to the previous verification point (303) and the current verification point (305). The method of FIG. 4 includes receiving (406) data corresponding to each one of the previous verification point (303) and the current verification point (305) from the file system (265). The method of FIG. 4 includes determining (408) whether the decision criteria (340) are satisfied. The determination of whether the decision criteria (340) are satisfied include comparing the data corresponding to the previous verification point (303) and the data corresponding to the current verification point (305), and depending on the particular rules defined determining additional criteria such as comparison of a keyword (410), an image (420), and a time period (430). The method of FIG. 4 includes replacing (412), if the decision criteria (340) are satisfied, the data corresponding to the previous verification point (303) with the data corresponding to the current verification point (305) stored in the file system (265). The method of FIG. 4 includes retaining (416) the data corresponding to the previous verification point if the decision criteria (340) are not satisfied. The method of FIG. 4 includes notifying (414 and 418), e.g., by sending an e-mail using the event notifier 207, whether the data corresponding to the previous verification point has been replaced or retained.

Figure 5:
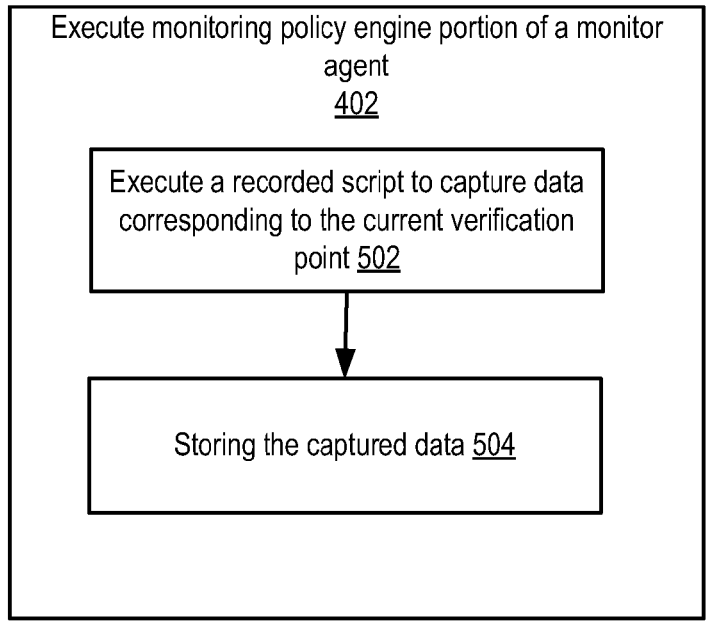
FIG. 5 sets forth a flow chart illustrating an exemplary method for executing a monitoring policy engine portion of a monitor agent according to embodiments of the present invention.

For further explanation, FIG. 5 sets forth a flow chart illustrating an exemplary method for executing (402) the monitoring policy engine (206) portion of the monitor agent (120) according to embodiments of the present invention. The method for executing (402) the monitoring policy engine (206) includes executing (502) a recorded script (previously recorded by the recorder 204) to capture current data corresponding to the current verification point (305). The captured current data is received by the monitor agent (120), and is stored (504) by the file system (265) for later use. As described earlier, the execution of the monitoring policy engine (206) may be automatically initiated upon completion of the recorded script.

Figure 6:
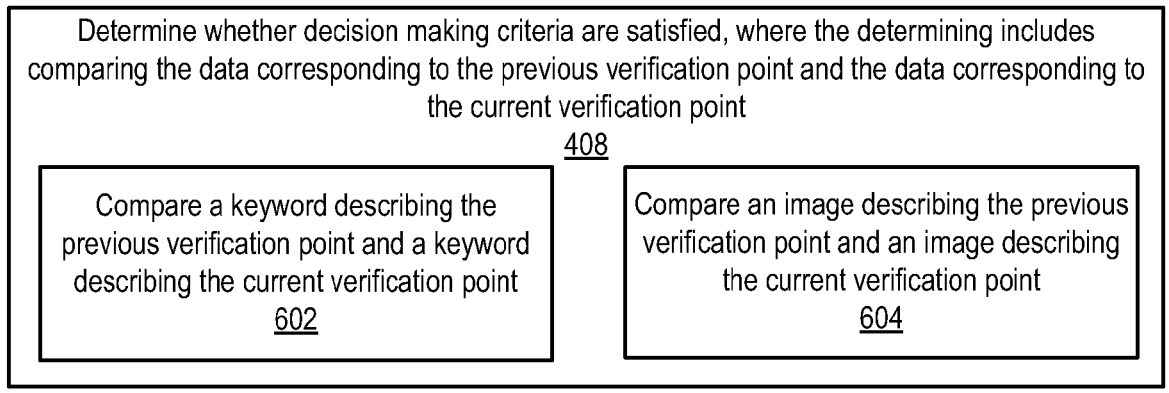
FIG. 6 sets forth a flow chart illustrating an exemplary method for determining whether decision criteria are satisfied, where the decision criteria include comparing data corresponding to a previous verification point and a current verification point according to embodiments of the present invention.

For further explanation, FIG. 6 sets forth a flow chart illustrating an exemplary method for determining (408) whether the decision criteria (340) are satisfied, where the decision criteria (340) include comparing the data corresponding to the previous verification point (303) and the data corresponding to the current verification point (305) according to embodiments of the present invention. The determination of whether the decision criteria (340) are satisfied is made by comparing (602) a keyword (410) describing one of a property, value, and content of the previous verification point (303) and the a keyword describing one of a property, value, and content of the current verification point (305) or by comparing an image (420) describing one of a property, value, and content of the previous verification point (303) and an image describing one of a property, value, and content of the current verification point (305). Although not illustrated, the determination may also be made by comparing the time period (430) in addition to or instead of the keyword (410) or the image (420).

Figure 7:
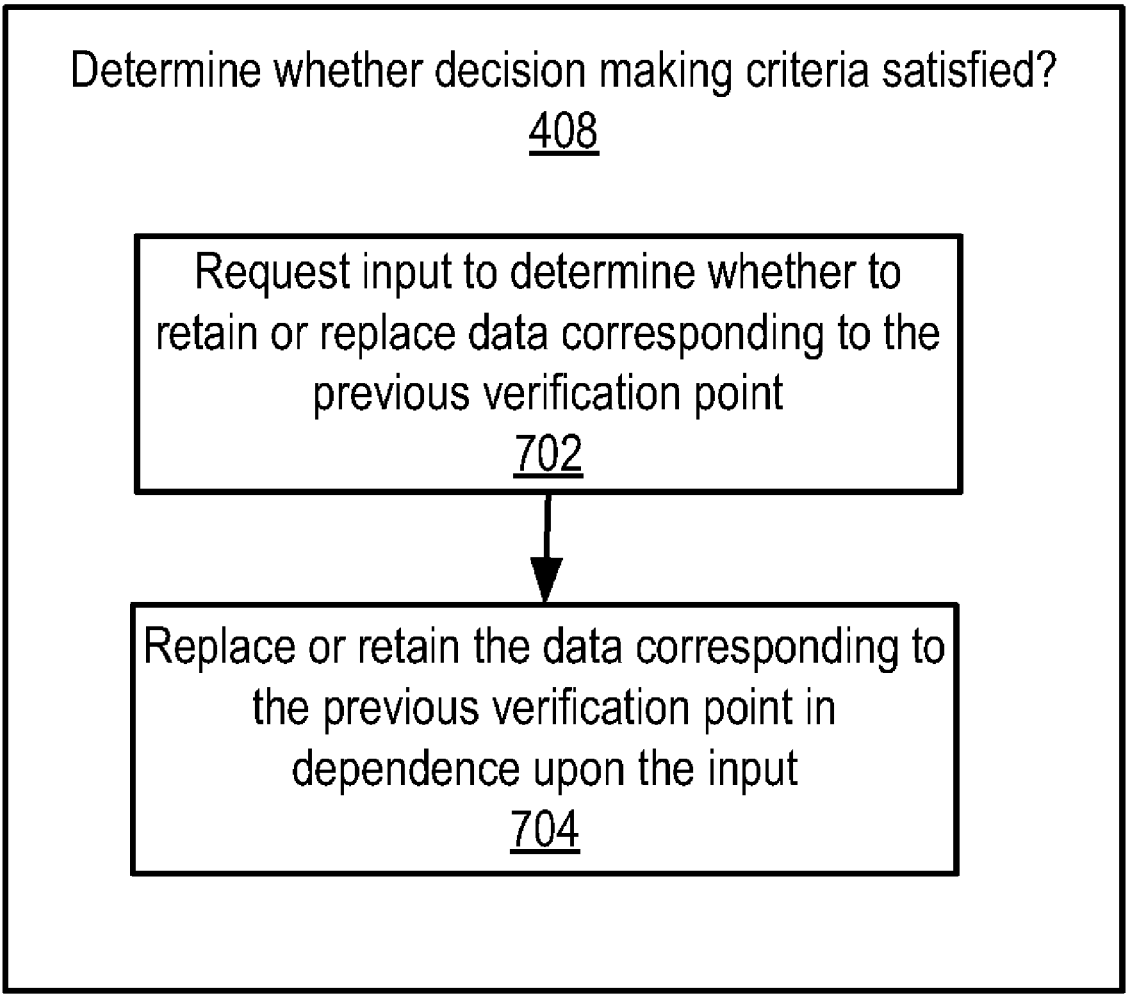
FIG. 7 sets forth a flow chart illustrating an exemplary method for determining whether decision criteria are satisfied according to embodiments of the present invention.

For further explanation, FIG. 7 sets forth a flow chart illustrating an exemplary method for determining (408) whether the decision criteria (340) are satisfied. The method for determining (408) whether the decision criteria (340) are satisfied includes requesting (702) an input to determine whether to retain or replace data corresponding to the previous verification point (303). The source of the input is defined by the rules (330), e.g., receive the input from an IT administrator. The replacement or retention (704) of the data corresponding to the previous verification point (303) is performed in dependence of the input.

Exemplary embodiments of the present invention are described to a large extent in this specification in terms of methods for monitoring performance of dynamic web content applications. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. For example, it should be understood that while the invention described monitoring contents of a GUI display for web applications, it would be within the spirit and scope of the invention to encompass an embodiment deploying a monitoring system for any GUI application.

Exemplary embodiments of the present invention are described largely in the context of a fully functional computer system for monitoring performance of dynamic web content applications. Readers of skill in the art will recognize, however, that the present invention also may be embodied in a computer program product disposed on computer readable media for use with any suitable data processing system. Such computer readable media may recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for monitoring performance of dynamic web content applications, the dynamic web content applications executing on one or more web servers comprising modules of automated computing machinery, the method comprising:

receiving, at run time, by a multi-mode monitor agent comprising a module of automated computing machinery, data corresponding to a previous verification point and data corresponding to a current verification point, wherein the previous verification point is for a drop-down list comprising a first set of entries and being of first dimensions identified by a first set of coordinates such that the previous verification point comprises a base reference to compare changes within a graphical user interface ('GUI') display of the dynamic web content applications and wherein the current verification point is for the drop-down list comprising a second set of entries and being of second dimensions identified by a second set of coordinates such that the current verification point comprises a subsequent reference to compare changes within the graphical user interface ('GUI') display of the dynamic web content applications;

determining, by the multi-mode monitor agent, whether decision criteria are satisfied, wherein the determining includes determining whether the second set of entries are different from the first set of entries or the second dimensions is different from the first dimensions by comparing the second set of coordinates to the first set of coordinates; and responsive to the decision criteria being satisfied, replacing, by the multi-mode monitor agent, the data corresponding to the previous verification point with the data corresponding to the current verification point responsive to decision criteria not being satisfied, retaining by the multi-mode monitor agent, the data corresponding to the previous verification point.

2. The method of claim 1 wherein replacing the data corresponding to the previous verification point with the data corresponding to the current verification point further comprises sending to a user a notification of the replacement of the data corresponding to the previous verification point to the data corresponding to the current verification point.

3. The method of claim 1 further comprising:
executing by the multi-mode monitor agent, a recorded script to capture data provided by the dynamic web content applications, wherein the captured data corresponds to the current verification point; and
storing, by the multi-mode monitor agent, the captured data in dependence upon the execution of the recorded script.

4. The method of claim 1 wherein comparing the data corresponding to the previous verification point and the data corresponding to the current verification point further comprises comparing a keyword describing the previous verification point and a keyword describing the current verification point.

5. The method of claim 1 wherein the comparing of the data corresponding to the previous verification point and the data corresponding to the current verification point further comprises comparing an image describing the previous verification point and an image describing the current verification point.

6. The method of claim 1 further comprising:
requesting, by the multi-mode monitor agent if the decision criteria are satisfied, an input to determine whether the data corresponding to the previous verification point is to be replaced or retained; and
replacing or retaining, by the multi-mode monitor agent, the data corresponding to the previous verification point in dependence upon the input.

7. A system for monitoring performance of dynamic web content applications, the system comprising a computer processor, a computer memory operatively coupled to the computer processor, the computer memory having disposed within it computer program instructions capable of:
receiving, at run time, by a multi-mode monitor agent comprising a module of automated computing machinery, data corresponding to a previous verification point and data corresponding to a current verification point, wherein the previous verification point is for a drop-down list comprising a first set of entries and being of first dimensions identified by a first set of coordinates such that the previous verification point comprises a base reference to compare changes within a graphical user interface ('GUI') display of the dynamic web content applications and wherein the current verification point is for the drop-down list comprising a second set of entries and being of second dimensions identified by a second set of coordinates such that the current verification point comprises a subsequent reference to compare changes within the graphical user interface ('GUI') display of the dynamic web content applications;
determining, by the multi-mode monitor agent, whether decision criteria are satisfied, wherein the determining includes determining whether the second set of entries are different from the first set of entries or the second dimensions is different from the first dimensions by comparing the second set of coordinates to the first set of coordinates; and
responsive to the decision criteria being satisfied, replacing, by the multi-mode monitor agent, the data corresponding to the previous verification point with the data corresponding to the current verification point
responsive to decision criteria not being satisfied, retaining by the multi-mode monitor agent, the data corresponding to the previous verification point.

8. The system of claim 7 wherein replacing the data corresponding to the previous verification point with the data corresponding to the current verification point further comprises sending to a user a notification of the replacement of the data corresponding to the previous verification point to the data corresponding to the current verification point.

9. The system of claim 7 further comprising computer program instructions capable of:
executing, by the multi-mode monitor agent, a recorded script to receive the data provided by the dynamic web content applications, wherein the captured data corresponds to the current verification point; and
storing, by the multi-mode monitor agent, the captured data in dependence upon the execution of the recorded script.

10. The system of claim 7 wherein comparing the data corresponding to previous verification point and the data corresponding to the current verification point further comprises comparing a keyword describing the previous verification point and a keyword describing the current verification point.

11. The system of claim 7 wherein comparing the data corresponding to previous verification point and the data corresponding to the current verification point further comprises comparing an image describing the previous verification point and an image describing the current verification point.

12. The system of claim 7 further comprising computer program instructions capable of:
requesting, by the multi-mode monitor agent if the decision criteria are satisfied, an input to determine whether the data corresponding to the previous verification point is to be replaced or retained; and
replacing or retaining, by the multi-mode monitor agent, the data corresponding to the previous verification point in dependence upon the input.

13. A non-transitory computer program product for monitoring performance of dynamic web content applications, the computer program product embodied in a computer-readable recordable medium, the computer program product comprising:
computer program instructions for receiving, at run time, by a multi-mode monitor agent comprising a module of automated computing machinery, data corresponding to a previous verification point and data corresponding to a current verification point, wherein the previous verification point is for a drop-down list comprising a first set of entries and being of first dimensions identified by a first set of coordinates such that the previous verification point comprises a base reference to compare changes within a graphical user interface ('GUI') display of the dynamic web content applications and wherein the current verification point is for the drop-down list comprising a second set of entries and being of second dimensions identified by a second set of coordinates such that the current verification point comprises a subsequent reference to compare changes within the graphical user interface ('GUI') display of the dynamic web content applications;
computer program instructions for determining, by the multi-mode monitor agent, whether decision criteria are satisfied, wherein the determining includes determining whether the second set of entries are different from the first set of entries or the second dimensions is different from the first dimensions by comparing the second set of coordinates to the first set of coordinates; and computer program instructions for replacing, by the multi-mode monitor agent responsive to the decision criteria being satisfied, the data corresponding to the previous verification point with the data corresponding to the current verification point computer program instructions for retaining, by the multi-mode monitor agent responsive to decision criteria not being satisfied, the data corresponding to the previous verification point.

14. The computer program product of claim 13 wherein replacing the data corresponding to the previous verification point with the data corresponding to the current verification point further comprises sending to a user a notification of the replacement of the data corresponding to the previous verification point to the data corresponding to the current verification point.

15. The computer program product of claim 13 further comprising:

computer program instructions for executing, by the multi-mode monitor agent, a recorded script to receive the data provided by the dynamic web content applications, wherein the captured data corresponds to the current verification point; and computer program instructions for storing, by the multi-mode monitor agent, the captured data in dependence upon the execution of the recorded script.

16. The computer program product of claim 13 wherein comparing the data corresponding to previous verification point and the data corresponding to the current verification further comprises comparing a keyword describing the previous verification point and a keyword describing the current verification point.

17. The computer program product of claim 13 wherein comparing the data corresponding to previous verification point and the data corresponding to the current verification further comprises comparing an image describing the previous verification point and an image describing the current verification point.

* * * * *